United States Patent [19]

Bodnar

[11] Patent Number: 5,561,998
[45] Date of Patent: Oct. 8, 1996

[54] ROTARY FORMING APPARATUS AND METHOD

[76] Inventor: Ernest R. Bodnar, 2 Danrose Crescent, Don Mills, Ontario, Canada, M3B 3N5

[21] Appl. No.: 307,762

[22] PCT Filed: Apr. 21, 1993

[86] PCT No.: PCT/CA93/00167

§ 371 Date: Sep. 26, 1994

§ 102(e) Date: Sep. 26, 1994

[87] PCT Pub. No.: WO93/20973

PCT Pub. Date: Oct. 28, 1994

[30] Foreign Application Priority Data

Apr. 22, 1992 [CA] Canada .................................. 2066803

[51] Int. Cl.$^6$ ............................... B21B 21/00; B21J 7/20
[52] U.S. Cl. ................................ 72/190; 72/191; 72/406; 83/686
[58] Field of Search ........................... 72/190, 191, 186, 72/406, 184; 83/670, 686

[56] References Cited

U.S. PATENT DOCUMENTS

| | | |
|---|---|---|
| 3,066,542 | 12/1962 | Einhiple . |
| 3,205,744 | 9/1965 | Huck ......................................... 83/670 |
| 3,643,537 | 2/1972 | Fries . |
| 4,273,015 | 6/1981 | Johnson . |
| 5,040,397 | 8/1991 | Bodnar ..................................... 72/190 |
| 5,386,620 | 2/1995 | Hinterlechner et al. .................. 72/452 |

*Primary Examiner*—Lowell A. Larson
*Assistant Examiner*—Rodney A. Butler
*Attorney, Agent, or Firm*—Jon Carl Gealow; Keck, Mahin & Cate

[57] ABSTRACT

A rotary apparatus (10) for forming materials such as sheet metal has upper and lower rotary members (12,14) rotating in unison on opposite sides of a moving strip of material, at least one die support (30,32) movably supported on each rotary member for carrying forming die means (34,36), each die support being movable in a semi-rotary manner relative to its rotary member, a first pair of guide pins (40,44) located at opposite ends of each die support and offset from one another towards the leading and trailing edges respectively, first guides (50,52,54,56) for the first pairs of guide pins located at respective ends of each rotary member, second pairs of guide pins (42,46) on each die support, located at opposite ends, and offset from one another towards the trailing edge and leading edge respectively, second guides (60,62,64,66) located at each end of each rotary member, the second guides engaging the second pairs of pins at a point just before the die supports close, and during closure of the die supports, and being disengaged from the second guides just after opening of the die supports. Also disclosed is an improved form of rotary die (36) having an ejection opening (84) for ejecting scrap pieces of material. Also disclosed is a method of forming materials using the apparatus described.

6 Claims, 6 Drawing Sheets

ROTARY FORMING APPARATUS AND METHOD

TECHNICAL FIELD

The invention relates to rotary apparatus for forming moving materials, and in particular, to such rotary apparatus wherein there are a plurality of forming or cutting dies, mounted on upper and lower rotating supports, and to improved dies especially although not exclusively for such rotary apparatus, and to a method of forming using such apparatus.

BACKGROUND ART

Roll forming of moving materials such as sheet metal is a well-known procedure, which results in high production speeds, and minimizes costs. However, in general, roll forming is suitable only for forming longitudinal formations along the length of the continuously moving strip.

If the material had to be cut, or if transverse formations were formed in it, then usually such formations or cuts were carried out by what is known as "flying dies". Such flying dies were reciprocated to and fro lengthwise along the length of the material, and closed on the material, when they had been accelerated up to the speed of the line.

In the great majority of cases however such flying dies were used only as cut off dies at the end of the line for simply cutting the material to the desired length.

In most cases, forming operations other than straight forward roll forming, were carried out on stationary punch presses, or a series or such stationary punch presses in what was known as "progressive dies". This technique however is much slower, and consequently production costs are greatly increased.

It will be appreciated from this background description, that most of these systems have reference to the forming of sheet metals, whether steel or other types of metal. However, many of these techniques have also been applied to the forming of a wide variety of other materials. For example, materials as various as plastic materials, cork, rubber, leather, carpet, paper, cardboard and textiles, to name only a few, have all been conventionally formed with some form of press operation with various types of different forming dies, both for cutting and/or forming impressions in such materials.

In U.S. Pat. No. RE 33,613 and U.S. Pat. No. 5,040,397, granted to E. R. Bodnar, there are disclosed a rotary forming apparatus for forming and punching material in a continuously moving strip. This apparatus and method is a substantial advance over prior art forming methods. In that apparatus, upper and lower rotary members were provided on opposite sides of the strip. On each of the rotary members there was at least one die support which was movable in a semi-rotary manner relative to the rotary member. Guide pins were provided at opposite ends of each die support. Guide pins were in turn controlled by guide grooves or cams at each end of the rotary member. The guide pin at one end of the die support was on the leading end of the die support, and the guide pin at the other end was on the trailing end of the support. The profiles of the two guide grooves were designed so that the leading and trailing guide pins at opposite ends of the die support, could ride in the two grooves simultaneously. In this way, the upper and lower die supports could be rotated into the correct position just prior to closing, during closing, and after closing, so that they were parallel with one another and so that the two dies were aligned and registered with one another thereby insuring that the dies closed and opened on the material to perform the forming or punching operations required in a precisely registered fashion.

In addition to this, register pins, and corresponding recesses, were provided in the die supports, to assist in registering the two die supports and their respective dies in the manner described.

Such apparatus was successful, and was operated with some degree of success. However, it has now been determined that an even greater degree of control can be obtained over the positioning of the die supports and dies, and produce still further advantages.

Accordingly, it is apparent that it is desirable to still further develop the foregoing apparatus, so as to produce more precise control over the position of the two respective die supports on their respective upper and lower rotary members, at a point just before they close, and while they close and while they open. Controlling of the position of the die supports during the rest of the rotation of the rotary members is not of course so critical, since the die supports and their respective dies are out of contact with one another, and are substantially inactive, and consequently registration is not required.

BRIEF SUMMARY OF THE INVENTION

With a view to providing the foregoing advantages, the invention comprises a rotary apparatus for forming material, and comprising upper and lower rotary members, adapted to rotate in unison on opposite sides of a moving strip of material, at least one die support movably supported on each said rotary member for carrying forming die means, each said die support being movable in a semi-rotary manner relative to its rotary member, a first pair of guide pins on each die support, said first pair of pins being located at opposite ends of said die support and offset from one another, towards the leading and trailing edge of each said die support respectively, first guide means for said first pair of guide pins located at respective ends of each said rotary member for guiding said first pair of guide pins, a second pair of guide pins on each said die support, located at opposite ends thereof, and offset from one another towards the trailing edge and leading edge respectively of each said die support, second guide means located at each end of each said rotary member, said second guide means being adapted to engage said second pair of pins at a point just before said die supports close, and during closure of said die supports, and being disengaged from said second guide means just after opening of said die supports.

The invention further comprises such a rotary apparatus and wherein said first pair of guide pins define a predetermined first spacing axially along an axis parallel to the axis of rotation of said rotary member, and wherein said second pair of guide pins define a predetermined second spacing axially, parallel to the axis of said rotary member, and wherein said second predetermined spacing is less than said first predetermined spacing.

The invention further comprises such a rotary apparatus and wherein said first guide means for said first guide pins define a predetermined spacing apart from one another, at opposite ends of said rotary members, and wherein said second guide means for said second guide pins define a second predetermined spacing from one another, at each end of said rotary members, and wherein said second spacing is less than said first spacing.

The invention further comprises such a rotary apparatus and wherein said first guide means comprise a pair of guide grooves, located at opposite ends of said rotary members, and shaped and adapted to receive respective first guide pins therein, and wherein said second guide means comprise guide cam means, at respective ends of said rotary members, and wherein said guide cam means at one end of said rotary members are located upstream, and wherein said guide cam means at the other end of said rotary members are located downstream, with respect to the axis of rotation of said rotary members.

The invention further comprises a method of forming moving material and comprising the steps of passing the same between pairs of rotary members each having at least one die support for carrying a die, movably mounted thereon, guiding said die supports by first guide means around a first guide path, from each end of said rotary members, around the complete axis of rotation of said rotary member, guiding said die supports by second guide means around a fraction of the arc of rotation of each said rotary member, said fraction of said arc comprising that portion of said arc commencing just before closure of said die supports on said material, until a point just after opening of said die supports, whereby said die supports are guided both by said first guide means and by said second guide means, over that portion of said arc from just prior to closing to just after opening thereof.

The invention further comprises such a method of forming moving material and including the step of punching a portion of said material, when said die supports close, and passing said punched out portion of said material through opening means in one of said die supports.

The invention further comprises a forming die for use in such rotary apparatus and having ejection opening means for receiving a scrap piece of material from said die and discharging the same.

As has been explained above, while such rotary apparatus has been developed in the past, in the particular context of the forming and punching of sheet metal, such rotary apparatus is of much wider application, and may be applied to the forming of a wide variety of different material and work pieces. As mentioned above, such materials may for example include plastics, cork, rubber, leather, carpet, paper, cardboard and textiles, to name only a few of the variety of materials which it may be desired to form or punch in any particular application.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

MODES OF CARRYING OUT THE INVENTION

Figure 1:
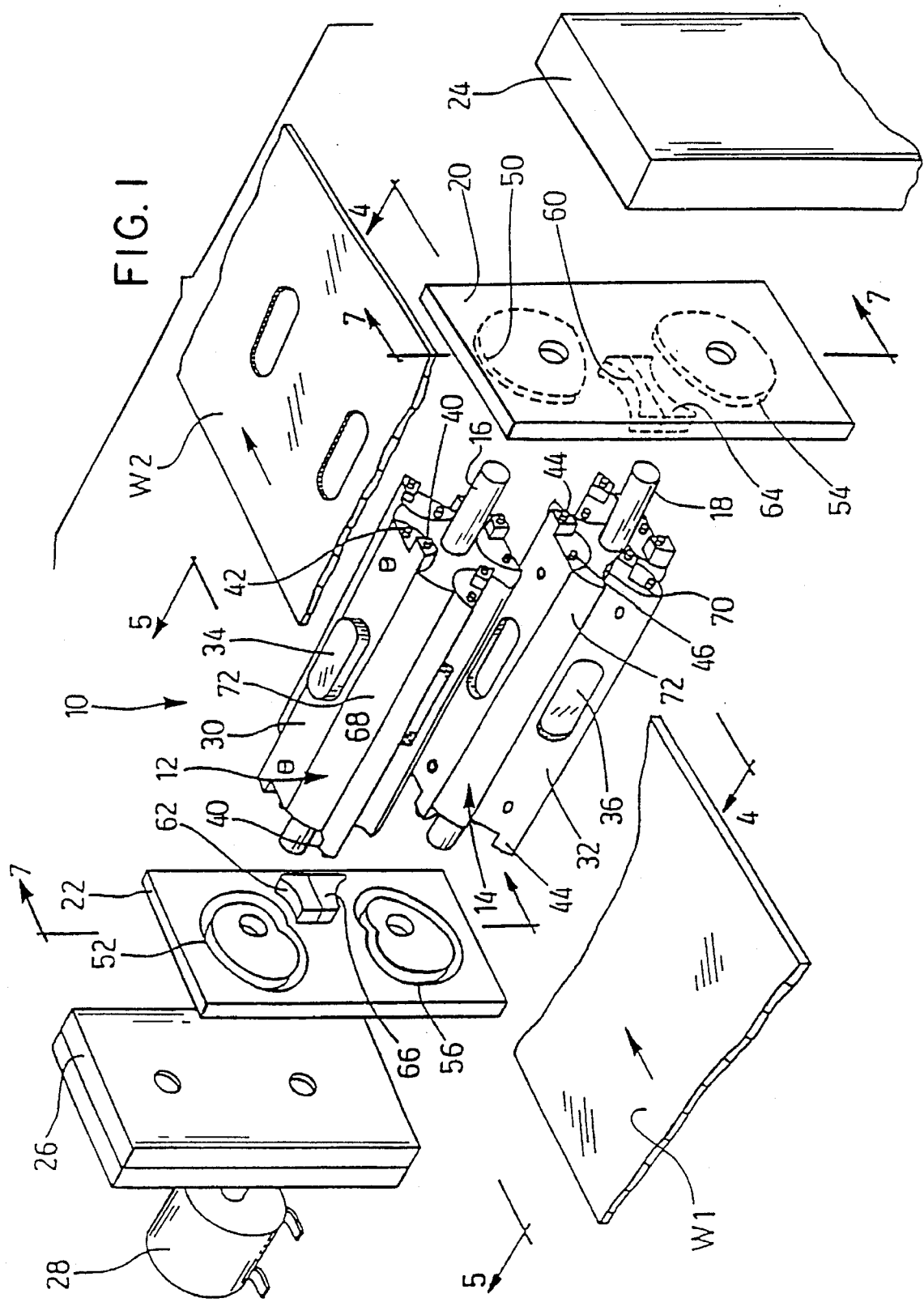
FIG. 1 is an exploded perspective illustration of a rotary apparatus in accordance with the invention.

Referring first of all to FIG. 1, it will be seen that rotary apparatus according the invention is indicated by the general reference arrow 10.

As has already been explained above, the rotary apparatus disclosed and described herein is of general application to the forming and/or punching of a wide variety of different types of materials.

For the sake of simplicity in this explanation, reference is made herein to the forming of sheet metal.

It will, however, be appreciated that this reference to sheet metal is purely for the sake of explanation of the rotary apparatus and does not in any way limit such rotary apparatus and its application to any one of a wide variety of different materials.

The rotary apparatus comprises an upper rotary member 12 and a lower rotary member 14. The upper rotary member 12 is mounted on a shaft 16 and a lower rotary member 14 is mounted on a shaft 18. End plates 20 and 22, provided with suitable bearings (not shown) such are well-known in the art, are provided for mounting the shafts 16 and 18. Drive housings 24 and 26 are provided, adjacent the respective end plates 20 and 22. A prime mover would be provided, such as the motor 28, which is shown merely by way of example.

In practice, such a prime mover might be part of an overall drive train for a complete forming line, if such was provided. Alternatively, if all that is being done is a simple punching operation as is represented in FIG. 1, then the motor 28 might in fact be provided in that location depending upon the design of the complete line.

Motor 28 is therefore merely representative of a prime mover at some location, which is coupled to the drive mechanisms 24 and 26.

By suitable gear trains (not shown) such as are well known in the art, the two shafts 16 and 18 are geared together so that they rotate precisely in unison with one another.

On the upper rotary member 12, there are in this case four moveable die support members 30, and on the lower rotary member 14, there are a like number of movable die support members 32. The die support members 30 and 32 will be seen to be of generally semi-cylindrical shape in section, and are movable in a semi-rotary manner relative to the respective rotary members 12 and 14 in a manner to be described below. Dies 34 are provided on die supports 30, and dies 36 are provided on die supports 32.

It will be appreciated that while what is shown in FIG. 1 is simply a punching operation, the dies may represent any form of dies which may either form or punch or both form and punch a material, for example sheet metal, or any other material.

In order to guide and control the positions of the upper die support members 30, each of the die support members 30 is provided with a first pair of guide pins 40-40, and the second pair of guide pins 42-42. As will be apparent from the following description the guide pins 40-40 are offset from one another, upstream and downstream, towards the leading and trailing edges with relation to each of the die supports 30. Similarly, the second guide pins 42-42 are offset with respect to one another downstream and upstream towards the trailing and leading edges, on each of the die supports 30.

The lower die supports 32 have first pairs of guide pins 44-44 and second pair of guide pins 46-46. The guide pins 44-44 are offset from one another towards the leading and trailing edges, and the guide pins 46-46 are offset from one another in the same way towards the trailing and leading edges as with the guide pins 40-42 of the upper die supports 30.

The first pair of guide pins 40-40 on the upper die supports 30, are adapted to ride in first guide means comprising continuous guide grooves 50-52 in respective end plates 20-22.

The first pair of guide pins 44-44 on the lower die supports 32 are adapted to ride in first guide means comprising the continuous guide grooves 54-56 in the end plates 20-22.

This will ensure that the positions of the respective upper and lower die supports 30-32 will be substantially controlled throughout 360 degrees of rotation of their respective rotary members 12 and 14.

The second pair of guide pins 42-42 on the upper die supports 30 are adapted to be guided around a portion of the arc of rotation of the rotary member 12, by second guide means comprising the guide members 60-62, secured to the respective plates 20 and 22.

The second guide pins 46-46 on the lower die supports 32, are adapted to be guided throughout a portion of the arc of rotation of the lower rotary member 14, by means of second guide means comprising the lower guide members 64-66 also secured to the respective end plates 20-22.

The reason for this will become apparent as the following description proceeds.

It will also be observed that the respective die supports 30 and 32 are received in respective semi-cylindrical recesses 68 and 70 in respective upper and lower rotary members 12 and 14. The respective die supports 30-32 are retained within the respective recesses 68-70, by suitable rotational retention devices (not shown) which may ride in rotation grooves 72-74 (or by any other suitable means).

The retention devices are such as to permit the semi cylindrical die supports 30-32 to rotate in a semi rotary manner relative to their rotary members 12-14, as shown.

Figure 2:
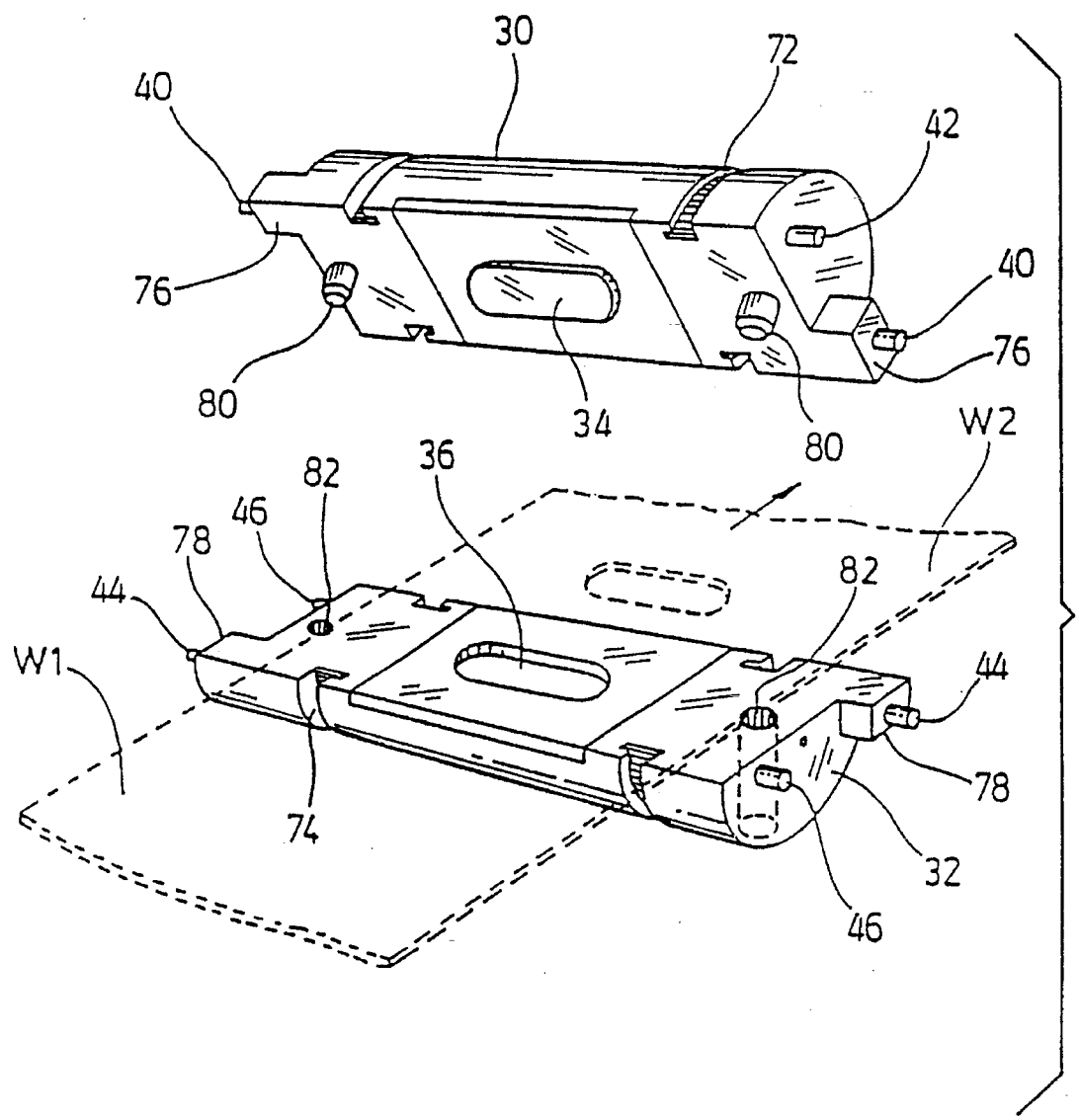
FIG. 2 is an exploded perspective view, showing respective upper and lower die support members in isolation.

Referring to FIG. 2, it will be observed that the die supports 30-32 are shown in a position which in fact could never be achieved in practice. The upper die support 30 is shown opened up. The lower die support 32 is shown substantially co-planar with the workpiece indicated as W1-W2.

Figure 3:
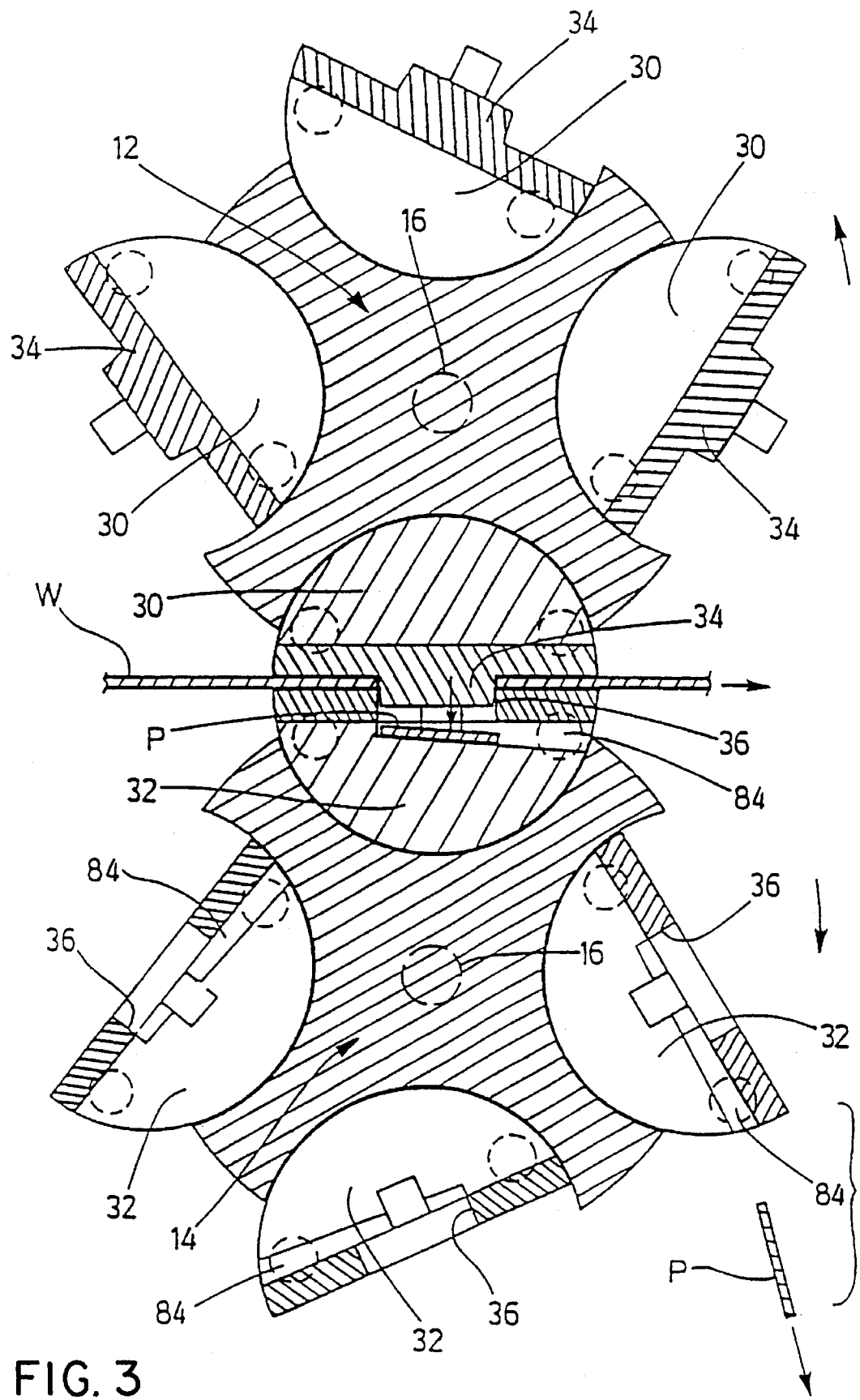
FIG. 3 is a section along the line 3—3 of FIG. 1.
Figure 4:
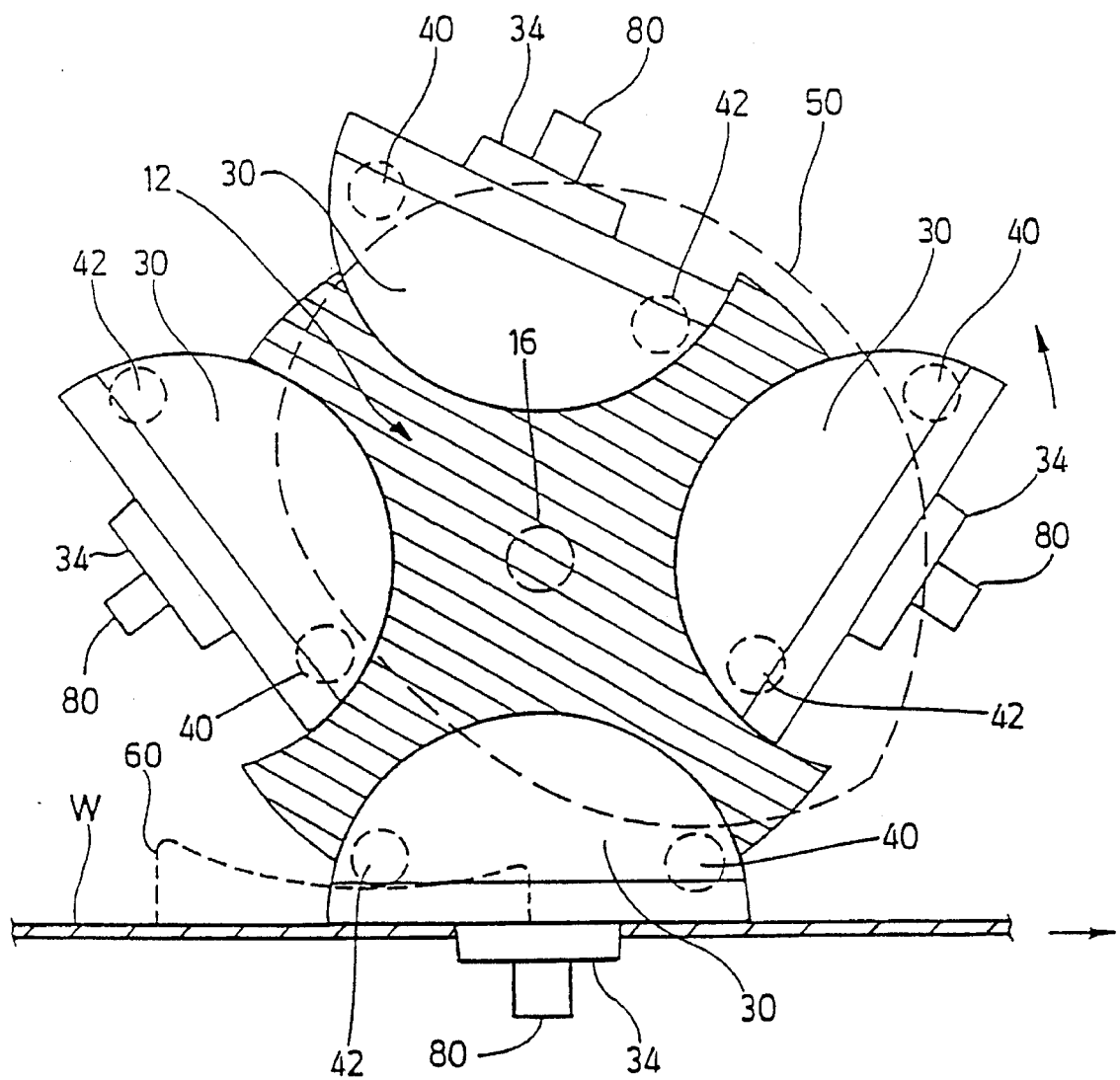
FIG. 4 is a schematic section along the line 4—4 of FIG. 1, showing the upper rotary member.
Figure 5:
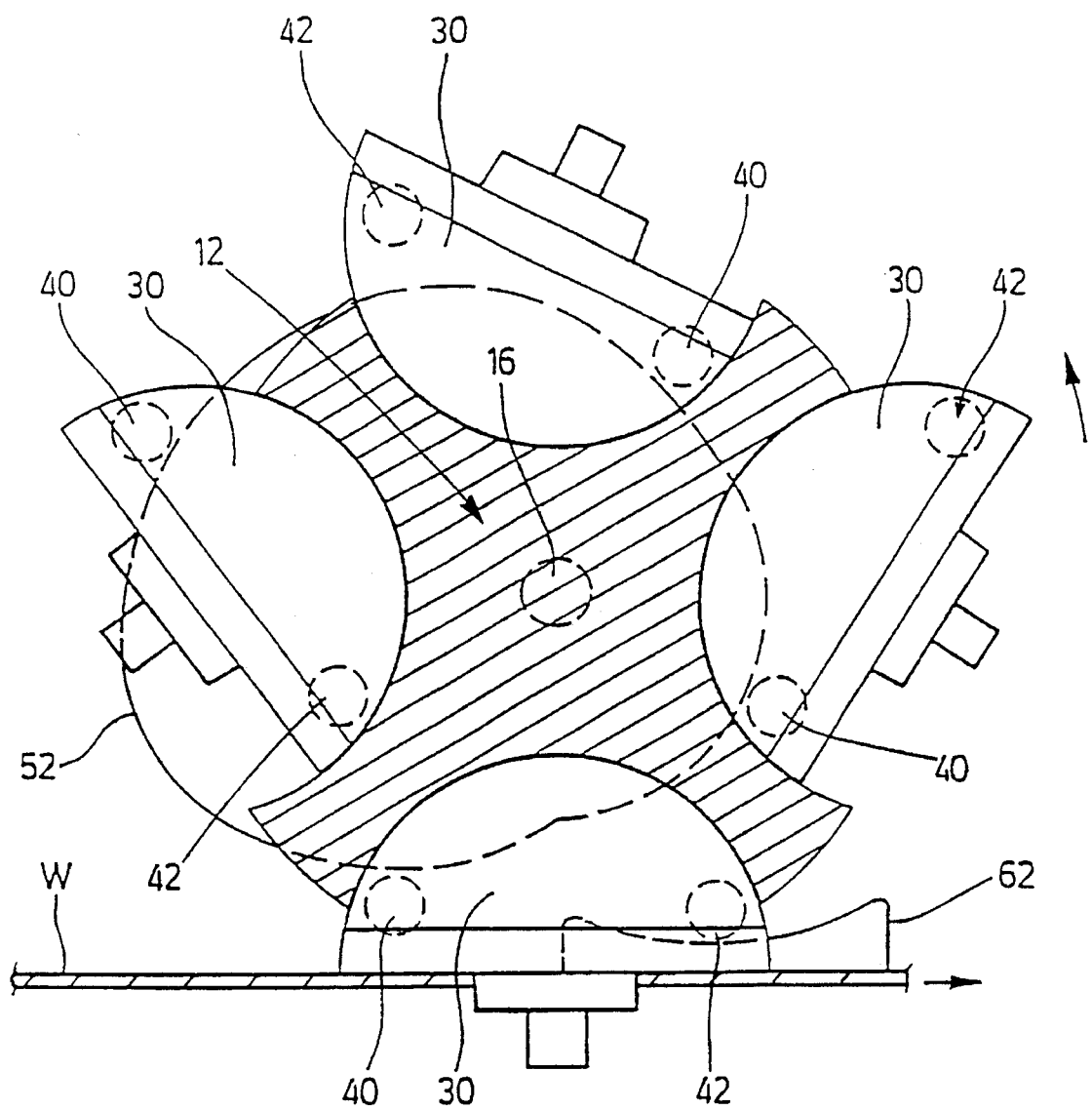
FIG. 5 is a schematic illustration corresponding to FIG. 4, along the line 5—5 of FIG. 1, showing the same rotary member but at its opposite end.

This of course could not occur, in practice, as will be apparent from the description relating to the FIGS. 3, 4 and 5.

However, for the convenience of the illustration, and for no other reasons, the two die supports 30 and 32 are shown in this way, somewhat displaced.

At this point, reference should be made to the first pair of guide pins 40-40 on the upper die supports 30 and the first pair of guide pins 44-44 on the lower die supports 32. It will be noted that these guide pins 40-40 and 44-44 respectively are mounted on endwise extensions 76-78. As a result, the ends of the respective first guide pins 40-40 and 44-44 define a predetermined first spacing.

The second pairs of guide pins 42-42 and 46-46 are secured directly to the bodies of the respective die supports 30-32.

The second guide pairs of guide pins 42-42 and 46-46 thus define a second predetermined spacing between their ends. The second predetermined spacing is less than the first predetermined spacing, for reasons to be described below.

Also shown in FIG. 2 are respective register pins 80-80 and pin openings 82-82, in respective upper and lower die supports 30 and 32.

The register pins 80 and openings 82 are substantially conventional in conventional punch dies operated on conventional punch presses, to assist in ensuring registration of the upper and lower dies.

In operation, the upper and lower rotary members 12-14 are rotated unison, as the workpiece W1-W2 passes therebetween. The position of actual closing and forming or punching of the opening, or the forming of a form in the material, is shown in FIG. 3. Assuming that a punching operation is being carried out, it will be seen that the upper male die 34 registers with lower die recess 36 and has punched a piece P out of the workpiece W. Lower die 36 defines an open lower end. As rotation proceeds, the punched-out piece P will drop down through the open lower end of die recess 36 and will pass out of a slotted opening 84 in the lower die support 32.

The manner in which the upper and lower die supports are controlled is illustrated essentially in FIGS. 4 and 5. FIGS. 4 and 5 illustrate only the guiding of respective opposite ends of the upper die supports 30 on the upper rotary member 12. It will of course be appreciated that the guiding of the die supports 32 on the lower rotary member 14 essentially correspond to FIGS. 4 and 5.

Thus in FIG. 4, showing what is the right hand end of the upper rotary member 12 of FIG. 1, it will be seen that the first guide pins 40 follow the path indicated as 50, defined by the groove 50 in end plate 20 (FIG. 1). The second guide pins 42, engage the guide cam or partial guide 60 also attached to end plate 20, only at the point where die support 30 is just beginning to close on the workpiece W, and throughout closure, and to a point just after the closure. During the remainder of the rotation of rotary support 12, the guide pins 32 are out of contact with any guiding means. However, this is irrelevant since throughout the remainder rotation, there is no chance of the upper and lower dies coming into contact, and consequently such precise guiding is not necessary.

In FIG. 5, representing the opposite end (ie left-hand end) of the same upper rotary member 12, it will be seen that the guide pins 40, in this case at the trailing edges of the die supports 30, are guided by the guide groove 52 in the end plate 22. The path of groove 52 differs from groove 50, to accommodate the respective pins 40, located respectively at leading and trailing edges of the die supports 30. Similarly, the second guide pins 42 (at the left-hand end) are guided through a portion of the arc only by means of contact with the guide cam 62. The portion of the arc in which the guide cam 62 is operative corresponds to the point at which the two dies are just beginning to close, and through closing, and to just opening. Throughout the rest of the rotation of the rotary member 12, the guide pins 42 are out of contact with any guide member. It will be appreciated that this is irrelevant and does not affect the operation of the invention. The locations of guide 60-62 differ from one another to accommodate the locations of the second guide pins 41-42 on trailing and leading of each rotary member 30.

Figure 7:
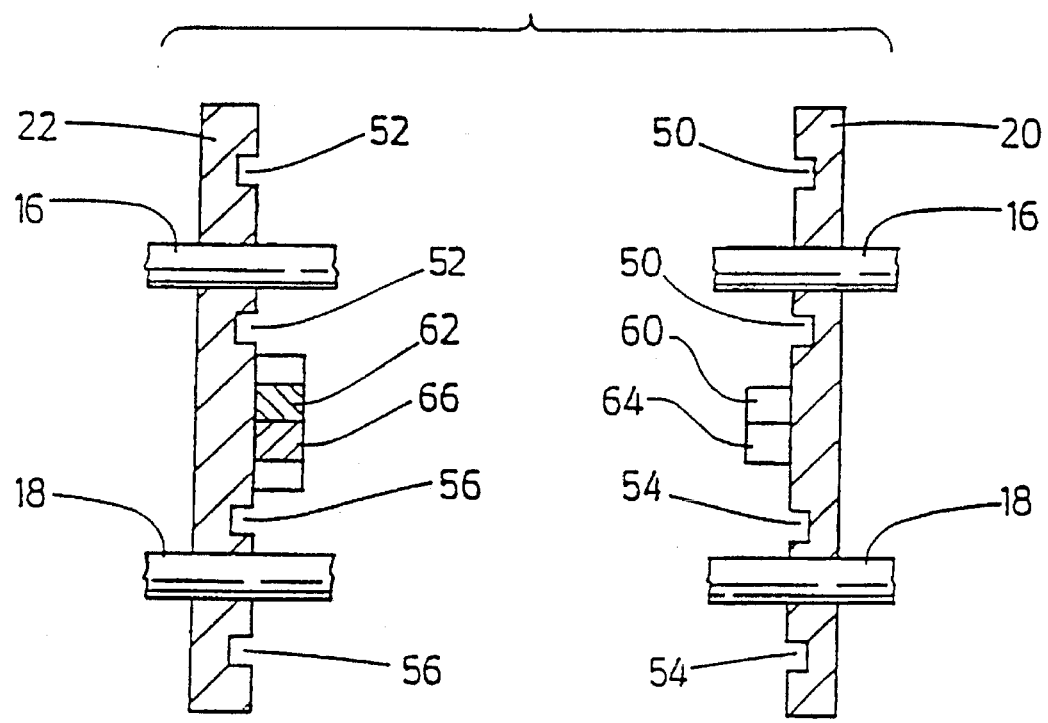

The manner in which the two guide pins 42-42 at opposite ends of each die support 30 are able to be guided through the crucial closing and opening of the dies, may be understood by reference to FIG. 7. In FIG. 7 it will be seen that the end plates 20 and 22 have guide grooves or recesses 50 and 52 formed therein for guide pins 40 of the upper rotary member 12, and guide grooves 54-56 for guide pins 44 the lower rotary member 14.

On the other hand, the guide cams 60, 62, for guide pins 42 of the upper rotary member, and 64, 66, for guide pins 46 of the lower rotary member, are secured to the surfaces of plates 20-22, but extend inwardly with respect to the grooves 50-52 and 54-56.

Consequently, while the first pair of guide pins 40-40 on each die support 30 can ride in the grooves 50-52 (with reference to the upper rotary member 12,) the second pair of guide pins 42-42 will engage the respective cams 60-62 without interference with the engagement of the first pair of guide pins 40-40 in their respective grooves.

The same general arrangement will also be seen to be true in respect of the die supports 32 of the lower rotary member 14 and their guide pins 44 and their grooves 54-56, and their guide pins 46 and their guide cams 64-66.

It will of course be appreciated that while the drawing illustrates the rotary apparatus in isolation, it may be used in this manner, simply as punching or forming any moving strip material.

In some cases, a punching operation will be followed by a forming operation, or two or three forming operations in some cases. Consequently, several pairs of upper and lower rotary members may be provided in some cases in succession, located in such a way that they are each operative to perform respective functions in precise locations on the material as required.

In addition, it will be appreciated that such punching and forming operations may also be combined with a continuous roll forming line, for forming continuous lengthwise formations in material, for example in sheet metal. In this case, the apparatus of the roll forming stations will normally be located downstream of the rotary members 12-14, in order to form the strip lengthwise in whatever way is required.

A cut off die of known design may be provided at the end of such a roll forming line. Alternatively, the cut-off may be achieved by means of further rotary members 12-14 having dies suitable for simply cutting the material, in this case sheet metal, as required.

Alternatively, it is possible that the cut to length function might be achieved upstream of the rotary members 12-14, if for any reasons it was desired to do so.

Description of these various options is however, believed to be unnecessary for the purpose of the description of the present invention.

It will be appreciated that for certain reasons it may be desirable to cause the engagement of the second pair of die pins with their respective partial guide members at a slightly earlier stage, than is illustrated in FIG. 5.

Figure 6:
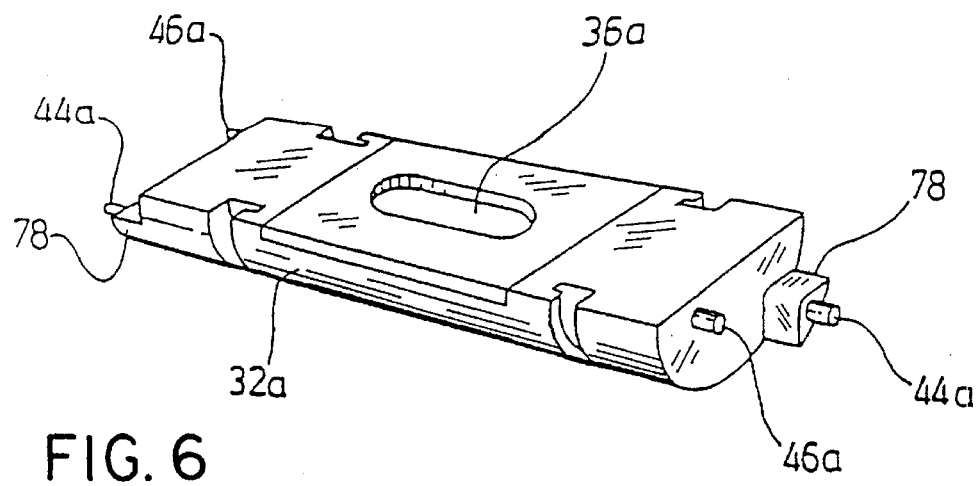
FIG. 6 is a perspective illustration of an alternate embodiment of die support member, and, FIG. 7 is a sectional illustration of certain portions of the apparatus of FIG. 1, along the line 7—7.

In this case, as shown in FIG. 6, an alternate arrangement of the first and second guide pins may be used. In this case the lower die support 32A is shown, with its die 36A in position therein.

In this case, the first guide pins 44A are shown mounted on extension blocks 78A, which are offset axially in a plane spaced from the die 36A, relative to the location of the second pair of guide pins 46A-46A. The second guide pins 46A are shown in their usual position.

The profiling of the continuous guide grooves for this modified form of the invention will obviously have to be modified, since the location of the first guide pins 44A which must run in those grooves has been moved.

However, by moving the support blocks 78A and the first pins 44A, so that they are effectively offset in a plane relative to the second guide pins 46A, there will be somewhat greater clearance available for bringing the second guide pins 46A into engagement with their respective guide members having a somewhat higher profile than that shown in FIGS. 1 to 5.

This may be particularly advantageous when using the invention with a work piece of a somewhat heavier section or gauge than usual.

The foregoing is a description of a preferred embodiment of the invention which is given here by way of example only. The invention is not to be taken as limited to any of the specific features as described, but comprehends all such variations thereof as come within the scope of the appended claims.

I claim:

1. A rotary apparatus (10) for forming a workpiece having upper and lower rotary members (12,14), adapted to rotate in unison on opposite sides of a workpiece (W) at least one die support (30,32), movably supported on each said rotary member for carrying forming die means (34,36) whereby the same may close and open relative to said workpiece, each said die support being movable in a semi-rotary manner relative to its rotary member and having leading and trailing edges, first leading and trailing guide pins (40,40), said first leading and trailing guide pins being located at opposite ends of each said die support and offset from one another towards the leading and trailing edges of each said die support respectively, and first leading and trailing guide means (50,52) for said first leading and trailing guide pins (40,40) located at respective ends of each said rotary member, for guiding said first leading and trailing guide pins and characterized by;

second leading and trailing guide pins (42,42) on each said die support, located at opposite ends thereof, and offset from one another towards the leading edge and trailing edge respectively of each said die support, and, second leading and trailing guide means (62,60) located at each end of said rotary member, said second leading and trailing guide means being adapted to respectively engage said second leading and trailing guide pins at a point just before said die supports close, and during closure of said die supports, and being disengaged from said second leading and trailing guide means just after opening of said die supports;

wherein said first leading and trailing guide pins (40,40) define a predetermined first axial spacing, and wherein said second leading and trailing guide pins (42,42) define a predetermined second axial spacing, and wherein said second predetermined axial spacing is less than said first predetermined axial spacing; and wherein said first leading and trailing guide means (50,52) for said first leading and trailing guide pins define a first predetermined axial spacing apart from one another, at opposite ends of said rotary members, and wherein said second leading and trailing guide means (62,60) for said second leading and trailing guide pins define a second predetermined axial spacing from one another, at each end of said rotary members, and wherein said second axial spacing is less than said first axial spacing.

2. A rotary apparatus as claimed in claim 1, and wherein said first leading and trailing guide means (50,52) comprise a pair of guide grooves, located at opposite ends of each said rotary member, and shaped and adapted to received respective first leading and trailing guide pins therein, and wherein said second leading and trailing guide means (62,60) comprise guide cam means, at respective ends of each said rotary member, and wherein said guide cam means at one end of said rotary members are located upstream, and wherein said guide cam means at the other end of said rotary members are located downstream, with respect to the axis of rotation of said rotary members.

3. A rotary apparatus as claimed in claim 1 wherein said forming die (36) includes ejection opening means (84) for receiving a scrap piece of workpiece from said die and adapted for discharging the same.

4. A rotary apparatus as claimed in claim 3, and wherein said forming die (36) defines a recess, with a lower opening, and ejection passageway means (84) communicating with said lower opening of said die recess (36), whereby said scrap piece of said workpiece may be discharged directly through said die recess and out of said ejection passageway means.

5. A method of forming moving workpiece including passing said workpiece between pairs of rotary members (12,14) each having at least one die support (32,34) movably mounted thereon for supporting die means (32,34), and guiding said die supports (32,34) by first leading and trailing guide means (40,40) around a first guide path, from each end of said rotary members, around the complete axis of rotation of said rotary members whereby the same close and open relative to said workpiece and characterized by;

guiding said die supports (32,34) by second leading and trailing guide means (42,42) on second leading and trailing guide portions (62,60) around a fraction of each said rotary member, said fraction comprising that portion commencing just before closure of said die supports, until a point just after opening of said die supports, whereby said die supports are guided both by said first leading and trailing guide means and by said second leading and trailing guide means, over that portion from just prior to closing to just after opening thereof.

6. A method of forming continuously moving material as claimed in claim 5 and including the step of punching a portion of said workpiece, when said die means close, and passing said punched out portion through opening means (84) in said die means (36).

* * * * *